Patented Aug. 20, 1940

2,211,960

UNITED STATES PATENT OFFICE 2,211,960

ARTIFICIAL CELLULOSIC MATERIAL BONDED TO RUBBER AND METHOD OF PRODUCING THE BOND

Frederick M. Meigs, Wilmington, Del., assignor, by mesne assignments, to E. I. du Pont de Nemours & Company, Wilmington, Del., a corporation of Delaware No Drawing. Application June 17, 1936, Serial No. 85,819

12 Claims. (Cl. 154—40)

This invention relates to the treatment of cellulosic materials to improve the adhesion thereto to natural rubber, compounded rubber, rubber substitutes and the like. More particularly, it relates to methods for obtaining improved adhesion between rubber and cellulosic threads, filaments, cords, fabrics and the like, and the products resulting from such methods. This invention is especially applicable to artificial threads as will be explained more in detail below.

In the past it has been found that artificial threads such as regenerated cellulose threads, filaments, cords and the like, adhere very poorly to compounded ruber stock when the two are united and the rubber stock is subsequently cured according to any of the known processes which produce commercially satisfactory adhesion between rubber and cotton. This poor adhesion of artificial threads to rubber has constituted a very serious obstacle to their use in place of cotton in the manufacture of automobile tires, reinforced rubber belts, and similar products consisting of alternate plies of rubber and cord which are required to adhere very strongly for long periods of time, under drastic conditions of high temperature, constant flexing and bending, shock, etc. Artificial threads would frequently be preferable to cotton in such use because of their continuous filament structure. If rayon cord, for example, is pressed into a commercial rubber stock such as is customarily used in the manufacture of tires and belting, and the whole is cured at high pressure and at an elevated temperature sufficient to completely vulcanize the rubber stock, it will be observed that the rayon cord can be pulled away from the rubber with comparative facility. Indeed, if subjected to a standard pull-out test which measures the force required to separate the cord from the rubber, rayon cord is found to adhere to rubber only approximately half as well as a similar cotton cord submitted to the same test.

It has now been discovered that certain compounds, when applied to rayon cord, will very greatly improve its adhesion to rubber. It has also been found that the adhesion of rayon cord to rubber is still further improved if the said compound is combined with a dispersion of rubber or latex or a solution of rubber, and applied to the cord. This invention enables the production of a rayon-reinforced rubber structure that is at least equal to and usually better, insofar as adhesion of the cord to the rubber is concerned, than similar rubber structures reinforced with untreated cotton.

It is an object of this invention to provide a method of securing improved adhesion between cellulosic material and rubber.

It is another object of this invention to provide a method for securing improved adhesion between rayon or other filamentous forms of regenerated cellulose and rubber.

A still further object of this invention relates to the production of artificial threads and plied structures made therefrom such as cords, comprising regenerated cellulose threads having a dry tenacity at room temperature (75° F.) in excess of two grams per denier characterized in that the rayon may be more firmly anchored to the rubber reinforced with said threads and/or plied structures.

Other objects of the invention will appear hereinafter.

The objects of the invention are accomplished in general by applying to cellulosic structures such as cellulosic threads and the like, a treating composition comprising an aqueous solution of a synthetic amine resin either alone or in combination with dispersed rubber or rubber latex, and drying the structure so treated whereby to greatly improve the adhesion between the cellulosic thread and rubber after their combination and vulcanization of the rubber, the adhesion being at least as good as the adhesion between untreated cotton and rubber after vulcanization, and from two to three times as good as that between untreated rayon threads and rubber after vulcanization.

In order to set forth more clearly and concisely the principles of the invention, it will be described with particular reference to rayon made by the viscose process and having a high dry tensile strength at room temperature (75° F.) of 2.0 grams or more per denier, and preferably of 2.5 grams or more per denier in the form of heavy cord. It is to be understood, however, that although the preferred form of artificial thread, employed by this invention, is strong rayon produced by the viscose process, the invention contemplates the treatment of any continuous filament cellulosic thread or filament structure produced by a wet process, that is to say, by coagulation from an aqueous cellulosic solution into an aqueous coagulating bath, for example, regenerated cellulose rayon made according to the cuprammonium or viscose process, cellulose esters such as lowly esterified cellulose acetate, of lowly etherified cellulose ethers such as lowly etherified glycol cellulose, lowly etherified methyl cellulose, lowly etherified ethyl cellulose, cellulose glycollic acid or the like.

The invention includes cords and fabrics of any type of construction made from cellulosic threads or filaments. Obviously, where a cellulose derivative, such as cellulose acetate, which is thermoplastic in nature, is used, the temperature to which the material is subjected in various steps of the process must be kept well below the softening point of the cellulose derivative. Furthermore, the materials with which the derivative is treated, must be so chosen that the steps of the process can be carried out at a temperature below the softening point of the cellulose derivative.

The preferred cellulosic material used in this invention is in the form of strong viscose rayon threads having a dry tensile strength at room temperature (75° F.) of above 2.0 grams per denier, prepared in a manner taught by H. H. Parker in his copending patent application Serial No. 676,463, filed June 19, 1933, or in the form of twisted structures, such as strands or cords plied to said strong rayon thread.

As the rubber to which said cellulosic thread structures will adhere the invention contemplates any compounded natural rubber stock or any compounded synthetic rubber stock such as polymerized isoprene, or polymerized butadiene, or polymerized halogen substituted butadiene such as halogen-2-butadiene-1,3 polymer, e. g. chloro-2-butadiene-1,3 polymer, and other types.

Moreover the rubber may contain any desired vulcanizers, stabilizers, accelerators, etc., singly or in any desired combination. In its preferred and common form the invention contemplates any commercial compounded rubber stock such as is commonly employed in the fabrication of automobile tires, hose, raincoat material, shoes, belting such as conveyor belts, fan belts, or other driving belts, or the like.

The term "rubber" unless otherwise modified, as used in the specification and claims, is intended to be used in its generic sense to include rubber substitutes, natural rubber, compounded rubber, synthetic rubber, and the like.

As a means for improving the adhesion of the cellulosic thread structure to rubber, this invention contemplates an acid-soluble, water-insoluble synthetic amine resin, either alone or in combination with dispersed rubber or rubber latex.

Amine resins suitable for use in the practice of the present invention are generally prepared by reacting, in the presence of a suitable reaction medium, and at a suitable temperature, a phenol having at least two free "reactive" positions (i. e. positions ortho and para to phenolic hydroxyl) and containing only organic groups as ring substituents, an aldehyde (particularly formaldehyde), and an organic compound, preferably of not over six carbon atoms, which has at least one amino nitrogen atom joined to aliphatic carbon (i. e. carbon which is not a part of an aromatic ring) and to at least one hydrogen atom, and isolating the resulting resinous reaction products. These resins are insoluble in water and soluble in dilute aqueous mineral or organic acids.

The preparation of certain of the above resins is described in the copending application of Harmon and Meigs Serial No. 85,820 filed June 17, 1936, the following examples being given to illustrate the preparation of such amino resins:

EXAMPLE A.—*Phenol-formaldehyde-dimethylamine resin*

To a solution of 564 grams (6 mols) of phenol in 680 grams (8.4 mols) of aqueous 37% formaldehyde was added with stirring and cooling at such a rate that the temperature remained below 10° C., an aqueous solution of 3 mols of dimethylaminomethanol (methyloldimethylamine) made by bubbling 135 grams (3 mols) of dimethylamine into 243 grams (3 mols) of cold aqueous 37% formaldehyde. The addition of this material required about an hour. The cooling bath was then removed and the temperature of the reaction mixture was allowed to rise spontaneously to 40° C., where it was held by means of a cooling bath until the exothermic reaction was over. The reaction mixture was then heated in a boiling water bath until the resinous mass which was formed was too thick to stir mechanically. It was transferred while hot to a beaker, cooled, and the brittle resin was ground in a cold mortar with a little cold water to a uniform slurry. The resin was filtered, washed thoroughly with water, and dried in vacuo at room temperature. The weight of light yellow, granular, dry resin was 900 grams. Analysis showed that the product contained 4.94% nitrogen. It was soluble in dilute (1.5%) acetic acid to the extent of at least 1 gram of resin to 99 grams of acid solution, in dilute sodium hydroxide solution, and in benzyl alcohol and pyridine. A film flowed from the acetic acid solution was, after being baked at 100° C. for 15 hours, clear, colorless, hard, and insoluble in dilute acids.

EXAMPLE B

Example A was repeated except that the ratio of reactants was phenol 1 mol, formaldehyde 1.4 mols, dimethylaminomethanol 1 mol. The resulting resin was a yellow amorphous powder. It was insoluble in most of the organic solvents except glycol monomethyl ether. It was soluble in the theoretical amount of 1.5% aqueous acetic acid (i. e., the amount of acid required to form a salt) and also soluble in dilute alkali solution. A suspension of this resin in ice-cold water dissolved when the water was saturated with carbon dioxide. A film flowed from a dilute (1.5%) acetic acid solution of this resin remained clear, and was soluble in such dilute acetic acid after prolonged baking at 100° C.

EXAMPLE C.—*m-Cresol-formaldehyde-dimethylamine resin*

A solution of 108 grams (1 mol) of meta-cresol in 113 grams (1.4 mols) of aqueous 37% formaldehyde solution was placed in a one-liter three-necked flask equipped with a reflux condenser, mechanical stirrer, dropping funnel, and thermometer. The solution was cooled in an ice bath to 3° C. and a solution of dimethylaminomethanol, made by bubbling 22.5 grams (0.5 mol) of dimethylamine into 40.5 grams (0.5 mol) of cold aqueous 37% formaldehyde, was added from the dropping funnel during the course of about 15 minutes at such a rate that the reaction temperature did not exceed 15° C. The ice bath was removed and the reaction was allowed to proceed spontaneously during which time (2 hours) the temperature rose to 28° C. When the spontaneous reaction had subsided, the mixture was heated to 86° C. in a water bath during the course of 30 minutes and held there until the resin became too stiff to stir mechanically (15 minutes). The mixture was transferred while hot to a beaker and allowed to cool. The water was decanted and the resin was ground with water to a thick uniform slurry in cold mortar. It was filtered, washed thoroughly with cold water, and dried to constant weight in a vacuum desiccator. The product was a very light yellow, amorphous powder which weighed 157 grams. The theoretical yield, assuming complete condensation, was 164 grams. Analysis showed the presence of 4.25% nitrogen. The theoretical amount of nitrogen is 4.3%. The resin was insoluble in toluene, acetone, ethyl acetate, alcohol, dioxan, and gasoline. A 25% solution of the resin in 10% aqueous acetic acid was clear, almost colorless, and syrupy.

EXAMPLE D

Example C was repeated except that the ratio of reactants was meta-cresol 1 mol, formaldehyde 1.1 mols, dimethylaminomethanol 1 mol. The purified resin was a cream-colored, amorphous powder which softened at slightly above room temperature. It was readily soluble in acetone, toluene, ethyl acetate, dilute (1.5%) acetic acid, or dilute sodium hydroxide. A film flowed from the aqueous acetic acid solution of the resin was readily soluble in dilute acetic acid, even after 20 hours of baking at 100° C.

EXAMPLE E.—o - Cresol-formaldehyde-dimethylamine resin

Example D was repeated except that o-cresol was substituted for the meta-cresol. The resin was a brown, very viscous, sticky mass which was readily soluble in 1.5% dilute acetic acid. A thin film of this resin was hardened somewhat by prolonged heating at 100° C., but it did not become insoluble in dilute acetic acid. The resin was soluble in acetone, ethanol, ethyl acetate, and dioxan.

EXAMPLE F.—Cresylic acid-formaldehyde-dimethylamine resin

To 115 grams (approximately 1 mol) of cresylic acid (containing 50% cresol, chiefly meta and para, and 50% of xylenol, boiling point 204–210° C.) was added 97.2 grams (1.2 mols) of 37% aqueous formaldehyde following the procedure described in preceding examples. To this mixture was added the addition product of 48.5 grams (0.6 mol) of 37% formaldehyde and 27 grams (0.6 mol) of dimethylamine. The temperature of the mixture was then raised gradually over a period of 40 minutes to 92° C. where it was held for a period of 4.5 hours.

EXAMPLE G.—Phenol-formaldehyde-piperidine resin

To 94 grams (1 mol) of phenol in a 500 cc., three-necked flask equipped with a mercury seal stirrer, reflux condenser, and thermometer, was added 117.4 grams (1.4 mols) of 37% aqueous formaldehyde. The mixture so obtained was cooled in an ice bath to 5° C. and to it was added a mixture of 68 grams (0.8 mol) of piperidine and 65 grams (0.8 mol) of 37% aqueous formaldehyde, which mixture had been prepared by adding the ingredients to each other in an ice bath with stirring, keeping the temperature below 30° C. During the addition the temperature rose to 22° C. The ice bath was then removed and the temperature of the mixture was raised gradually over a period of 40 minutes to 93° C. where it was held for a period of five hours.

EXAMPLE H.—Resorcinol-formaldehyde-methylamine resin

To a solution of 110 grams (1 mol) of resorcinol in 200 cc. of water cooled in an ice-salt bath there was quickly added at −5° C. a cold solution of 15.5 grams (0.5 mol) of methylamine in 81 grams (1 mol) of 37% aqueous formaldehyde. A thick rubbery resin formed within two minutes and the temperature rose to 10° C. An additional 200 cc. of water was added, and the stirred mixture was then allowed to stand at room temperature for ½ hour. The resin, which was purified by the technique described in Example A, was light yellow in color and weighed 145 grams. It was soluble in dilute (1.5%) acetic acid and in 9% ammonium hydroxide solution. A film flowed from such a dilute acetic acid solution of the resin was darkened by baking at 100° C. and it remained soluble in 1.5% dilute acetic acid.

A number of phenols which can be used in the preparation of the amino resins have been disclosed in the examples above. In addition to these, similar resins have been made from the following phenols: bis(4-hydroxyphenyl)dimethylmethane, xylenol, bis(4-hydroxyphenyl)cyclohexane, p-cyclohexylphenol, and side-chain n-dodecyl phenol. The phenols may be mononuclear or polynuclear, including naphthols, or they may be non-condensed as in the hydroxydiphenyls and bis(4-hydroxyphenyl)dimethylmethane, or they may be in a combination of condensed and non-condensed nuclei, as in di-beta-naphthol. They may contain organic substituent groups provided at least two reactive positions are left open, e. g. tertiary-amyl phenol and tertiary-heptyl phenol.

Suitable amines to be used for the preparation of resins are methylamine, dimethylamine, diethylamine, cyclohexylamine, 2-aminocyclohexanol, piperidine, glucamine, etc.

In addition to aqueous formaldehyde, paraformaldehyde and other compounds yielding formaldehyde may be used.

As the means for obtaining a cellulosic thread structure having thereon a synthetic amine resin either alone or in combination with rubber, an aqueous solution or dispersion is employed containing either the synthetic amine resin alone or in combination with dispersed rubber or rubber latex, passing the cellulosic thread structure in the form of individual cords or a fabric through the solution and drying the so treated cord or fabric at a temperature of 250° F. or less such as cord is generally subjected to during the drying and vulcanizing or curing operations in the manufacture of tires, fan belts and the like.

The synthetic amine resins suitable for use in the operation of this invention are acid soluble and those are preferred which are soluble at least to the extent of from 2 to 5% by weight in dilute acid solutions containing from 0.5 to 1.5% by weight of acid. Furthermore, those synthetic amine resins are preferred which will condense or polymerize to an insoluble, infusible form when subjected to the conditions such as cord is generally subjected to during the drying and vulcanizing or curing operations in the manufacture of tires, fan belts and the like. This invention, however, also contemplates synthetic amine resins which will condense or polymerize to a water-insoluble thermoplastic form of high softening point. It is understood that these amino resins may be used singly or in any desired combination.

The acids particularly suitable for dissolving the synthetic amine resin are preferably organic acids and more particularly those organic acids which possess a low boiling point so that, during the drying operation of the cord or fabric previously treated by passage through the aqueous solution containing the synthetic amine resin and the acid, the acid will be substantially completely evaporated and removed from the cord or fabric in order to eliminate any possible deleterious effect any residual acid on the cord or fabric might have upon the cellulosic structure. Among the organic acids possessing these qualifications and therefore particularly suitable for use in dissolving the amine resin may be mentioned formic and acetic acids. If desirable, however, other higher boiling organic acids may be used in which case it is preferable to increase the time or temperature or both of drying the cord after passage through the aqueous solution of the synthetic amine resin in order to insure substantially complete removal of acid from the cord. It is, however, easily possible and usually preferable according to this invention to select for use for dissolving the synthetic amine resin such organic acids which are substantially completely removed from the treated cord or fabric when dried according to the methods in use in current commercial processes for the treatment of cords or fabrics for use in automobile tires, fan belts or the like.

While treatment of rayon with such an aqueous acid solution of a synthetic amine resin as has been described with subsequent drying to substantially completely remove the acid from the cellulosic structure improves the adhesion of rayon to rubber, this invention also contemplates the employment of an aqueous acid solution of a synthetic amine resin in combination with dispersed rubber or rubber latex. This may be accomplished in a number of ways the simplest and most convenient of which contemplates the combination of an aqueous acid solution of the synthetic amine resin with an aqueous acidic dispersion of rubber or rubber latex before application to the rayon. The latex or rubber may be present in the solution for treating the rayon in any desired proportion although the improvement in adhesion is most marked when concentrations of rubber or latex solids are used which are between 2 and 25% by weight and preferably between 5 and 15% by weight. If a natural latex dispersion is used it may be either crude acidified latex or latex which contains added materials or which has been treated to alter the character of the rubber in it for instance by degradation or oxidation or both. For instance it may contain any desired and suitable accelerators, vulcanizers, stabilizers, dispersing agents or any other substances such as are commonly used in the rubber industry. When rubber is used as an artificial acidic dispersion in water of either natural rubber or any known synthetic rubber it may likewise contain additionally such substances as rubber accelerators, vulcanizers, stabilizers, dispersing agents and the like. The type or kind of rubber dispersion or rubber latex to be used depends to some extent on the type or kind of rubber stock to which it is desired to bond the treated rayon. For example, to obtain good adhesion between the treated rayon and synthetic rubber composed of chloro-2-butadiene-1,3 polymer, it is preferable to treat the rayon with the aqueous dispersion of the synthetic amine resin in combination with chloro-2-butadiene-1,3 polymer latex.

The preparation of an acidic rubber dispersion or rubber latex, suitable for use in the operation of this invention, from a dispersion of rubber or alkaline rubber latex may be accomplished by any of the known methods for preparing such a rubber dispersion or latex, such as for example, by stabilizing the rubber dispersion or rubber latex with a small amount of ammonium caseinate, removing the ammonia from the latex by addition of the required amount of formaldehyde and then adding with stirring to the stabilized latex sufficient acid to bring the pH of the latex below 6. Preferably although not necessarily the same acid is used to acidify the rubber dispersion or rubber latex as is used in dissolving the synthetic amine resin which is to be used in combination with the acidic rubber dispersion or rubber latex. The choice of a suitable acid for acidifying the dispersion of rubber or rubber latex is governed by the same considerations discussed in connection with suitable acids for use in dissolving the synthetic amine resin.

The simplest and most convenient method for preparing an aqueous acidic solution of a synthetic amine resin together with dispersed rubber or rubber latex is to combine with stirring an aqueous acidic solution of a synthetic amine resin with an aqueous acidic dispersion of rubber or rubber latex.

Instead of applying dispersed rubber or rubber latex to the cord together with the synthetic amine resin in a single step from an aqueous solution which contains both the synthetic amine resin and the dispersed rubber or rubber latex this invention also contemplates as a method for improving the adhesion of rayon to rubber the steps of treating the rayon with an aqueous acidic solution of the synthetic amine resin, subsequently drying the cord at a temperature sufficient to insure substantially complete removal of the acid and then treating the resulting synthetic amine resin coated rayon with a solution of rubber in toluene or other suitable rubber solvent, drying the so treated cord to evaporate the solvent so that the cord has a coating of the synthetic amine resin and on that a coating of rubber. The rubber solution used may be a solution of either natural or synthetic rubber and may be either raw rubber or rubber compounded with any of the usual accelerators, vulcanizers, stabilizers and the like which are commonly added to rubber or of degraded, oxidized or otherwise modified rubber.

Other variations in the method of applying to rayon cord a synthetic amine resin and rubber or rubber latex to improve the adhesion of the cord to rubber are also possible according to this invention. For instance the cord may be treated first with an aqueous acidic solution of a synthetic amine resin and dried to substantially completely remove the acid and then with an aqueous acidic solution of a synthetic amine resin to which an acidified dispersion of rubber or rubber latex has also been added. Or the rayon cord may be given two treatments, the first with an aqueous acidic mixture containing a synthetic amine resin and dispersed rubber or rubber latex and then with the same aqueous acidic mixture containing the synthetic amine resin and dispersed rubber or rubber latex or with a different aqueous acidic mixture containing a synthetic amine resin and dispersed rubber or rubber latex and containing a different ratio of synthetic amine resin to rubber solids. It is understood that after each aqueous treatment the cord is dried before the application of the next successive treatment.

The application of a composition containing a synthetic amine resin alone or together with a dispersion of rubber or rubber latex from an aqueous solution to rayon cord or fabric may be accomplished in a number of ways. For example the rayon cord or fabric may be passed through the composition contained in a tank then between two doctor knives or squeeze rolls to remove the excess composition from the cord or fabric and thence over a series of dryer rolls maintained at a temperature sufficiently high to dry out the cord or fabric and to insure substantially complete removal of the acid. Other equally suitable means for applying the composition containing the synthetic amine resin and rubber to rayon cord or fabric may be employed such as by means of transfer rolls, by spraying, brushing, etc. Likewise drying of the treated rayon cord or fabric may be accomplished in other ways such as for example by means of a belt or frame carrying the treated rayon cord or fabric through a heated closed chamber, etc.

If rayon tire cord treated with an aqueous dispersion containing a synthetic amine resin and dispersed rubber or rubber latex and dried at an elevated temperature in the manner described by this invention is placed upon a commercial compounded rubber stock such as is customarily used in the manufacture of tires and the whole is cured at high pressure and elevated temperature sufficient to vulcanize the rubber stock completely, the treated rayon cord is found to strongly adhere to the rubber. Indeed if the cord is subjected to a standard pull-out test which measures the force required to separate the cord from the rubber and therefore constitutes a measure of the adhesion between the cord and rubber it is found that the adhesion between the treated rayon and rubber is at least equal to and often greater than that obtained between cotton and rubber and may be two or even more times better than the adhesion between untreated rayon and rubber. If the treated rayon cord is subjected to a standard pull-out test at an elevated temperature for example at 270° F. to measure the adhesion between the cord and rubber at this temperature the adhesion is found to be equal to and often better than the adhesion of cotton cord to rubber at this temperature, a fact which is of utmost importance in the construction of tires, fan belts and similar articles which develop a high temperature under ordinary conditions of usage. This constitutes a great advantage in the above described treatment over a number of other adhesion treatments which when applied to rayon result in a treated cord with good adhesion to rubber at room temperature but with poor adhesion to rubber at an elevated temperature.

Furthermore rayon cord treated according to this invention in order to improve its adhesion to rubber undergoes no marked decrease in fatigue resistance. Fatigue resistance of a tire cord is measured in a variety of ways in one of which the cord is subjected for a fixed number of flexings to drastic conditions of flexing and simultaneous stretching at an elevated temperature which conditions approximate those encountered during the actual use of tires. The tensile strength of the cord after the prescribed flexing and stretching compared with the tensile strength before the test gives a measure of the fatigue resistance of the cord. For rayon cord treated according to this invention the drop in tensile strength after the fatigue resistance test is very slight whereas cotton cord loses its tensile strength entirely when subjected to the same test. This improved resistance to fatigue at elevated temperatures exhibited by rayon cord treated according to this invention is a great advantage in cord designed for use in tires, fan belts and the like which develop a high temperature under ordinary conditions of usage and at the same time undergo constant and severe flexing, bending and stretching.

It is to be understood that, although the application of a synthetic amine resin either alone or in combination with dispersed rubber or rubber latex has been largely described herein as a means for improving the adhesion of rayon tire cord or fabric to rubber, this method is by no means limited to these specific cellulosic structures. A synthetic amine resin either alone or in combination with dispersed rubber or rubber latex is equally useful for adhering rubber to a great variety of cellulosic structures such as for example regenerated cellulose precipitated from an aqueous dispersion in the form of films, tubing, straw, ribbons, sponges and the like; also for adhering rubber to staple rayon, bristles, artificial horsehair and the like.

In order more clearly to illustrate this invention the following examples are given. It is, of course, to be understood that the invention is not limited to these precise examples which are merely illustrative of the invention. Obviously various other modifications will occur to those skilled in the art which, however, do not depart from the spirit and nature of this invention.

EXAMPLE I

An aqueous solution is prepared containing 2.5% by weight of a cresol-formaldehyde-dimethyl amine polymer and 1% by weight of acetic acid. Cord from viscose process rayon and of construction suitable for use in automobile tires is passed through this solution slowly enough to be thoroughly wet and is then dried at a temperature of 85° C. or higher by passage over heated rollers or by other suitable means and is then laid upon a thin sheet of compounded rubber stock and the whole subjected to sufficient temperature and pressure to completely vulcanize the rubber. After curing the rayon cord is found to adhere very firmly to the rubber so that a force is required to separate it which is at least twice as great as is required for bare untreated rayon and is approximately equal to or greater than that required in the case of untreated cotton cord used in the manufacture of tires.

EXAMPLE II

An aqueous solution is prepared containing 2% by weight of bis(4-hydroxyphenyl) dimethylmethane-formaldehyde-dimethylamine polymer, 10% by weight of natural rubber latex solids, 3% by weight of acetic acid and 0.5% by weight of ammonium caseinate. Rayon tire cord is passed through this solution, dried, applied to compounded rubber stock and the cord and rubber cured or vulcanized just as described in Example I to give a product exhibiting good adhesion between the rayon cord and rubber.

EXAMPLE III

An aqueous solution is prepared containing 2% by weight of xylenol-formaldehyde-dimethylamine polymer, 10% by weight of rubber latex solids containing suitable accelerators, vulcanizers, stabilizers, etc., 5% by weight of acetic acid and 0.5% by weight of ammonium caseinate. Rayon tire cord is passed through this solution, dried, applied to compounded rubber stock and the cord and rubber cured or vulcanized just as described in Example I to give a product exhibiting good adhesion between the rayon cord and rubber.

When rayon tire cord is passed through the following solutions, dried, applied to compounded rubber stock and the cord and rubber cured or vulcanized as described in Example I a product is obtained exhibiting good adhesion between the rayon cord and rubber.

Example IV

An aqueous solution containing 2% by weight of phenol-formaldehyde-piperidine polymer and 1% by weight of acetic acid.

Example V

An aqueous solution containing 5% by weight of resorcinol - phenol - formaldehyde - dimethylamine polymer and 2% by weight of acetic acid.

Example VI

An aqueous solution containing 2.5% by weight of cresylic acid - formaldehyde - dimethylamine polymer, 10% by weight of natural rubber latex solids, 3% by weight of formic acid and 0.5% by weight of ammonium caseinate.

Example VII

An aqueous solution containing 2.5% by weight of bis(4-hydroxyphenyl) cyclohexane-formaldehyde-dimethylamine polymer and 1% by weight of acetic acid.

A particularly good latex for use according to the methods described comprises a so-called creamed latex prepared by treating natural rubber latex with soap, ammonium alginate, and the like, creaming as by whipping or other vigorous agitation at a temperature of 70–90° C., skimming, and using the top portion which has been skimmed off. The creamed latex is then used in the same way as the various latices disclosed in the examples.

Instead of drying the cord at elevated temperatures as set forth in the preceding examples, the impregnated cord may be dried at room temperature or thereabouts, and subsequently vulcanized to the rubber at the customary temperature.

Parts and proportions are intended to be parts and proportions by weight unless otherwise indicated.

Since it is obvious that many changes and modifications of the invention can be made within the nature and spirit thereof, it is to be understood that the invention is not to be limited thereto except as set forth in the appended claims.

I claim:

1. In the process of manufacturing reinforced rubber articles such as rubber tires and the like, the steps which comprise treating threads, cords, fabrics, and the like prepared from continuous artificial cellulosic filaments with an aqueous solution containing, as an essential bonding ingredient, an amine-phenol-aldehyde resin, associating the article so treated with vulcanizable rubber, and then subjecting the mass to a vulcanizing temperature.

2. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier with an aqueous acid solution containing, as an essential bonding ingredient, an amine-phenol-aldehyde resin, treating the threads, cords, fabrics and the like to insolubilize said resin, associating the article so treated with vulcanizable rubber, and then subjecting the mass to a vulcanizing temperature.

3. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier with an aqueous acid solution containing, as essential bonding ingredients, rubber latex and an amine-phenol-aldehyde resin, treating the threads, cords, fabrics and the like to insolubilize said resin, associating the article so treated with vulcanizable rubber, and then subjecting the mass to a vulcanizing temperature.

4. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier with an aqueous solution containing, as essential bonding ingredients, rubber latex together with an organic acid and an amine-phenol-aldehyde resin, heating the threads, cords, fabrics and the like, so treated, at a temperature sufficiently elevated to insolubilize said resin, associating the article so treated with vulcanizable rubber, and then subjecting the mass to a vulcanizing temperature.

5. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier and obtained from viscose, with an aqueous solution containing, as essential bonding ingredients, rubber latex together with a volatile organic acid and an amine-phenol-aldehyde resin, heating the threads, cords, fabrics and the like, so treated, at a temperature sufficiently elevated to volatilize the acid and insolubilize said resin, associating the article so treated with vulcanizable rubber, and then subjecting the mass to a vulcanizing temperature.

6. In the process of manufacturing reinforced rubber articles such as rubber tires and the like, the steps which comprise treating threads, cords, fabrics and the like prepared from continuous artificial cellulosic filaments with an aqueous solution containing, as an essential bonding ingredient, an amine-phenol-aldehyde resin, drying the threads, cords, fabrics, and the like so treated, plying the same with sheets of commercial compounded vulcanizable rubber, and then subjecting the mass to a vulcanizing temperature.

7. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier with an aqueous acid solution containing, as an essential bonding ingredient, an amine-phenol-aldehyde resin, drying the threads, cords, fabrics, and the like so treated, plying the same with sheets of commercial compounded vulcanizable rubber, and then subjecting the mass to a vulcanizing temperature.

8. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier with an aqueous solution containing, as essential bonding ingredients, rubber latex, together with an organic acid and an amine-phenol-aldehyde resin, drying the threads, cords, fabrics, and the like so treated, plying the same with sheets of commercial compounded vulcanizable rubber, and then subjecting the mass to a vulcanizing temperature.

9. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier and obtained from viscose, with an aqueous solution containing, as essential bonding ingredients, rubber latex, together with a volatile organic acid and an amine-phenol-aldehyde resin, drying the threads, cords, fabrics, and the like so treated, plying the same with sheets of commercial compounded vulcanizable rubber, and then subjecting the mass to a vulcanizing temperature.

10. Vulcanized rubber articles, such as rubber tires and the like, reinforced with threads, cords, fabrics and the like prepared from continuous artificial cellulosic filaments, said threads, cords, fabrics and the like being adhered to the rubber in said articles by means of a composition comprising, as an essential bonding ingredient, an amine-phenol-aldehyde resin.

11. Vulcanized rubber articles, such as rubber tires and the like, reinforced with threads, cords, fabrics and the like prepared from continuous regenerated cellulose filaments having a dry tenacity at room temperature of above two grams per denier, said threads, cords, fabrics and the like being adhered to the rubber in said articles by means of a composition comprising, as an essential bonding ingredient, an amine-phenol-aldehyde resin.

12. Vulcanized rubber articles, such as rubber tires and the like, reinforced with threads, cords, fabrics and the like prepared from continuous regenerated cellulose filaments having a dry tenacity at room temperature of above two grams per denier obtained from viscose, said threads, cords, fabrics and the like being adhered to the rubber in said articles by means of a composition comprising, as essential bonding ingredient, an amine-phenol-aldehyde resin and rubber.

FREDERICK M. MEIGS.